United States Patent [19]

Ivanov et al.

[11] Patent Number: 5,557,497
[45] Date of Patent: Sep. 17, 1996

[54] CAPACITOR WITH A DOUBLE ELECTRIC LAYER

[75] Inventors: Alexander M. Ivanov; Isaac Y. Bognitski; Arkadiy F. Gerasimov; Sergei E. Efimov, all of Moscow; Vadim G. Savintsev, Pushkino; Andrei V. Fomin; Sergei V. Chizhevski, both of Moscow, all of Russian Federation

[73] Assignee: Econd, Russian Federation

[21] Appl. No.: 86,910

[22] Filed: Jul. 2, 1993

[30] Foreign Application Priority Data

Jul. 3, 1992 [RU] Russian Federation ............... 5050652

[51] Int. Cl.[6] ..................................... H01G 9/155
[52] U.S. Cl. ........................................ 361/502
[58] Field of Search ..................... 361/502, 505; 29/25.03; 252/502, 510, 511; 429/210, 212, 213, 217; 264/105

[56] References Cited

U.S. PATENT DOCUMENTS

| 3,288,641 | 11/1966 | Rightmire . | |
|---|---|---|---|
| 3,536,963 | 10/1970 | Boos . | |
| 3,634,736 | 1/1992 | Boos et al. . | |
| 3,648,126 | 3/1972 | Boos et al. . | |
| 4,327,400 | 4/1982 | Muranaka et al. | 361/502 |
| 4,697,224 | 9/1987 | Watanabe et al. | 361/502 |
| 4,717,595 | 1/1988 | Watanabe et al. | 252/511 |
| 4,810,599 | 3/1989 | Kondo et al. | 429/212 |
| 5,136,473 | 8/1992 | Tsuchiya et al. | 361/502 |
| 5,150,283 | 9/1992 | Yoshida et al. | 361/502 |
| 5,186,877 | 2/1993 | Watanabe | 264/105 |
| 5,277,729 | 1/1994 | Endo et al. | 264/105 |

FOREIGN PATENT DOCUMENTS

| 58-48360 | 3/1983 | Japan . | |
|---|---|---|---|
| 2-94509 | 4/1990 | Japan | 361/502 |
| 3-06807 | 1/1991 | Japan | 361/502 |
| 4-22062 | 1/1992 | Japan . | |
| 2-337584 | 7/1992 | Japan . | |

*Primary Examiner*—Teresa J. Walberg
*Assistant Examiner*—Gregory L. Mills
*Attorney, Agent, or Firm*—Vaden, Eickenroht, Thompson & Feather, L.L.P.

[57] ABSTRACT

This invention relates to a large capacitor for accumulating electrical energy. In particular, to a capacitor with a double electric layer comprising an electrolyte; at least one pair of electrolyte impregnated electrodes which are elastically compressible and independently, mechanically stable; and a separator also impregnated with electrolyte for being in between and in contact with both of the at least one pair of electrolytic impregnated electrodes for ionic conductance but electronically separating the electrodes; at least one pair of electrolytes impermeable and electrolyte inert current collectors in contact respectively with the at least one pair of the electrolyte impregnated electrodes; and an insulating gasket for separating the electrolyte impermeable and electrolytic inert collectors.

In at least some embodiments of this capacitor, the electrolytic impregnated electrodes are composed of various forms of carbon particles in combination with porous elastic dielectrics and polymer binders.

42 Claims, 1 Drawing Sheet

CAPACITOR WITH A DOUBLE ELECTRIC LAYER

SUMMARY OF THE INVENTION

The present invention relates to a large capacitor for accumulating electrical energy utilizing an electrolyte, at least one pair of electrolyte impregnated electrodes which are elastically compressible and independently, mechanically stable. These at least one pair of electrolyte impregnated electrodes may be formed from coarse or large highly porous particles; and relatively smaller particles having low resistance and high conductance which are formed into a three dimensional elastic ramified matrix to form a three-dimensional electron conducting ramified mass. These electrolyte impregnated electrodes are separated by a separator member also impregnated with electrolyte for ionic conducting and electronic separating of the electrodes. Each of the electrolyte impregnated electrodes are covered by an electrolyte inert and impermeable collector which is in contact with one and the other respectively of the pair of electrolyte impregnated electrodes. An insulating gasket is provided for separating the pair of electrolyte impermeable and electrolyte inert current collectors.

BACKGROUND OF THE ART

The prior art has provided at least two basic types of capacitors utilizing electrodes. One basic form was of the paste type, and the other was a rigid or welded type in the form of a ceramic like rigid structure. Both of these prior art types have suffered from certain problems associated with providing large capacitance for large capacitors and also problems associated with their use in the field or operating environments.

Some of the problems associated with the paste type electrodes have been the fact that the paste of the electrode itself creates significant problems in terms of the paste oozing through the capacitor seals. In some prior art, paste capacitors, special rings have been created to hermetically seal the capacitor and to prevent the paste electrodes from loosing their shape or oozing the paste out of the electrode thereby causing the electrode to fail.

The hard electrode type prior art capacitors, while not having the problem associated with those of the paste electrodes, have the additional problems of providing good contact between the collector plate and the electrodes. Many of the prior art patents dealt with providing a perfectly smooth hard surface for the combining of the collector to the electrode. Further these hard electrodes tend to be more brittle and subject to being more easily damaged in their field environment. Once these hard electrodes crack, they are lost from use.

Prior art patents such as U.S. Pat. No. 3,536,963, issued to Boos, et al, having a paste electrode is an example of some of the type electrodes utilizing the ring or gasket function 14 of holding the paste inside the electrode and giving the electrode shape.

Further from U.S. Pat. No. 3,288,641 issued to Rightmire, it can be seen that there would be many manufacturing problems associated with the formation of these electrodes. For example, such problems as achieving a mass-atomic layer of thinness in the electrodes. Yet another problem was contact both between the collector plates and the ion conductor and electronic separator of this invention. Also the problems associated with creating a perfect contact between all of the components without gaps which have an effect on performance and capacity of the invention made the manufacture of these capacitors very expensive.

Further prior art patents such as U.S. Pat. No. 3,634,736 issued to Boos also attempted to utilize rigid gaskets, as in gasket 15, to confine the electrodes 13 and 14 and prevent the mass of electrode material from seeping out during its operating life.

It has also been a problem in the prior art that in the attempt to compress the collector plates and the ion separator membrane against the electrodes, that the gasket seal utilized in the paste electrodes serves as an interference point when the capacitors are compressed. If the compression occurs when the capacitors are stacked one on top of the other, the compression can not go beyond the thickness of the gasket ring itself without causing the gasket itself to fail, thereby limiting the ability to achieve the full interfacing of the collector plate, ion conductor with the electrodes if compression is used in a stacked configuration.

OBJECTS OF THE INVENTION

It is the object of this invention to provide a capacitor with a double electric layer having such electrodes that would enable it to increase the energy storage capacity.

The further object of this invention is to provide a capacitor which is easy to assemble as a double electric layer electrode capacitor.

It is the further object of this invention to provide a capacitor with electrodes which have the best features of the paste type electrode and the best features of the rigid type electrodes.

It is the further object of this inventions to provide an inexpensive and cheap form of electrode with a high capacitance and rapid electrical energy output.

It is yet a further object of this invention to provide an electrode surface which is easily brought into full contact with both the separator and the collector plates by mechanical conforming of the collector plates and the separator with the surface of the electrode to establish a high degree of contact therebetween.

Further, it is the object of this invention to provide a capacitor which can be very readily compressed in stacked relationship, and whose gasket seals do not interfere with the compression of the capacitor in such stacked relationship.

It is yet a further object of this invention to provide electrodes which are not highly rigid and are not sensitive to cracking and breaking.

It is yet a further object of this invention to provide effective contact with the current collecting plates even under high pressure.

It is a further object of this invention to provide a stable electrode which is not difficult to manufacture and has a stable shape in and of its own manufacture and which does not relying upon outside retaining means to define or create its shape.

It is a further object of this invention to manufacture an electrode which does not require special design elements to hold it in its shape or form.

It is a further object of this invention to provide an electrode which does not have a squeezing out of the electrode contents.

It is also the further object of this invention to provide a large electrode which is easy to assemble and which can be built with a large surface area even as large as 100 sq cm or more.

A further object of this invention is to maximize the carbon to carbon electrical contact and provide as much surface area as possible for the storage of electrical charge.

Also an object of this invention is to have a capacitor formed which produces consistent results each time it is formed.

Further objects and advantages of this invention will be more fully understood from the detailed specifications and drawings.

IN THE DRAWINGS

SPECIFICATIONS

Figure 1:
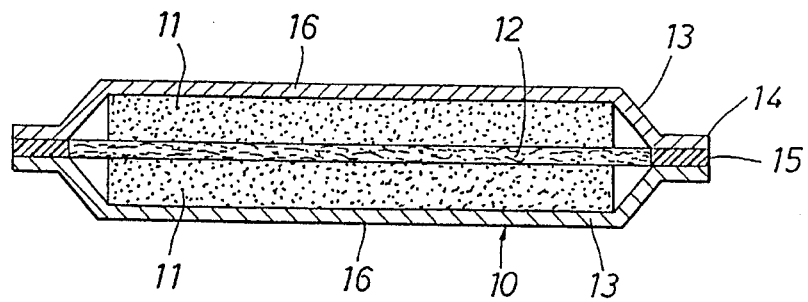
FIG. 1 is a cross sectional view of the capacitor of this invention.

Referring generally to the drawings of this invention, wherein in FIG. 1, the capacitor 10 of this invention is generally shown. The double electric layer comprising two (2) electrolyte impregnated electrodes 11, are shown in general in FIG. 1.

These electrolytic impregnated electrodes 11 are formed in such a way as to be elastically compressible and yet be independently, mechanically stable. It should be noted that no guard ring or retainer is shown in FIG. 1. Further, by being elastically compressible, this means that these electrodes 11 will be resistent to fractures because they are less brittle than the more rigid type electrodes.

It can be further seen in FIG. 1 that these pair of electrolytic impregnated electrodes 11 are separated by an ionic separator 12 which is in contact with both of the electrolytic impregnated electrodes 11. Also shown in FIG. 1 of this invention are a pair of electrolyte impermeable and electrolyte inert current collectors 13 which are respectively in contact with one of the electrolytic impregnated electrodes 11. Along the perimeter 14 of the electrolyte impermeable and electrolyte inert current collectors 13, is an insulating gasket 15 for separating the pair of electrolytic impermeable and electrolytic inert current collectors 13.

It should be noted in the drawing at the perimeter 14 where the insulating gasket 15 is attached that the gasket 15 does not form a collar around the condenser 10 but simply serves the function of insulating the two electrolyte impermeable and electrolyte inert current collectors 13 and sealing the electrolyte impregnated electrodes 11 and ionic separator 12 and electrolyte inside the capacitor.

It should be noted that the surface 16 of the electrolyte impermeable and electrolyte inert current collectors 13 are significantly above the union point on the perimeter 14 of the electrolyte impermeable and electrolyte inert current collectors 13 and insulating gasket 15. The advantage of this feature will become more apparent when more fully discussed herein.

In at least one embodiment, the electrolyte impregnated electrodes 11 are a double electric layer comprising two electrolytic impregnated electrodes 11 formed from activated carbon particles. These electrodes 11 are separated with an ionic conducting porous separator 12 impregnated with an electrolyte. Also provided are two electrolyte impermeable and electrolyte inert current collectors 13 which embrace the electrodes 11 and are separated with insulating gaskets 15 along the perimeter 14 of the capacitors 10 in accordance with this invention.

Figure 2:
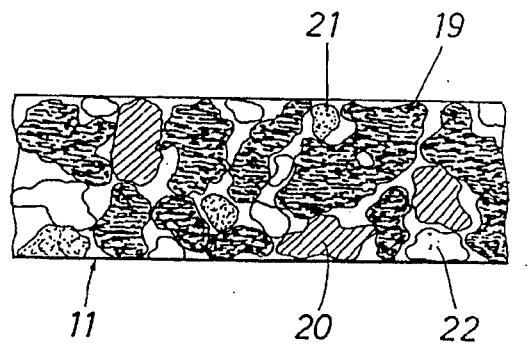
FIG. 2 is a diagrammatic drawing of the mechanical embodiment of one of the electrodes of this invention in magnified schematics.

Further, according to this invention and as diagrammatically shown in FIG. 2, each electrode 11 should be elastically compressible and independently mechanically stable and this is achieved in at least one embodiment where the electrode 11 consists of a mixture of activated carbon particles 19, dispersed carbon 20, a porous electric dielectric 21, and a polymer binder 22. Also, in this invention there has been acquired greatly improved contact between the electrodes 11 and the current collectors 13. This improved current contact between the activated carbon in one embodiment is partially acquired by the great improvement of the compressible elasticity nature of the final capacitor product. This composition also increases the ion conductivity in the porous space of the electrode and the mechanical strength. In such an example as this, each such electrodes 11 does not require the use of any flexible guard ring in order to prevent its spreading from its original shape, thus this composition is independently mechanically stable.

In at least one embodiment of this invention the two electrolytic impregnated electrodes 11, are formed from a mixture of coarse particles of activated carbon 19 having an average size within the range of 1 micron to 100 microns and smaller particles of dispersed carbon 20 having an average size in the range of 0.1–1 micron and the ratio or mixture of the small particles of dispersed carbon 20 in the electrodes 11 being within the range of 1.0%–40% by weight to obtain the maximum specific surface of the activated (porous) carbon and smaller carbon particles in the capacitor 10 to achieve low electron resistance.

In this embodiment the porous elastic dielectric particles 21 are preferably made of a cellular plastic material 21a (FIG. 3) having communicating pores and an average particle size of 1 to 50 microns or it may be fibrous material 21b (FIG. 4) having a diameter of fiber of 0.3–50 microns and a length of 0.1 mm to 5.0 mm. The porous elastic dielectric particle 21 in part, imparts, part of these characteristics which allow for the compression of the capacitor to relatively high compressive forces without deterioration of the contact between the carbon particles or a breaking of the electrodes.

The type materials which seem preferred are porous elastic dielectric particles like cellular plastic materials being a micro-porous rubber particles which combine high elasticity and ion conductivity in their pores.

Also a polymer binder 22 is used to firmly secure the structural integrity and to hold the carbon particles firmly in contact with each other. These polymer binders 22 are preferably polyvinyl alcohols, polysaccharides or rubbers or flurol plastic materials because they have good adhesion to activated carbon 19 and dispersed carbon 20 and are chemically resistant in an electrolyte solution.

Figure 3:
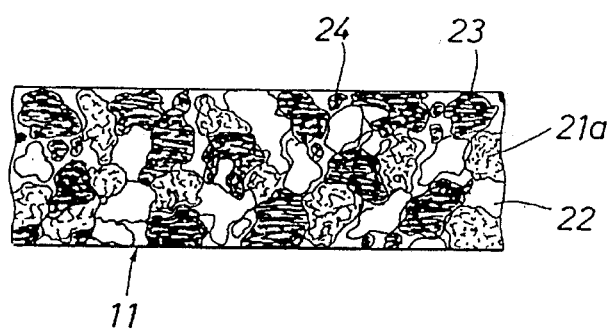
FIG. 3 is a diagrammatic drawing of the mechanical embodiment of another of the electrodes of this invention in magnified schematics showing the use of a cellular plastic dielectric material.
Figure 4:
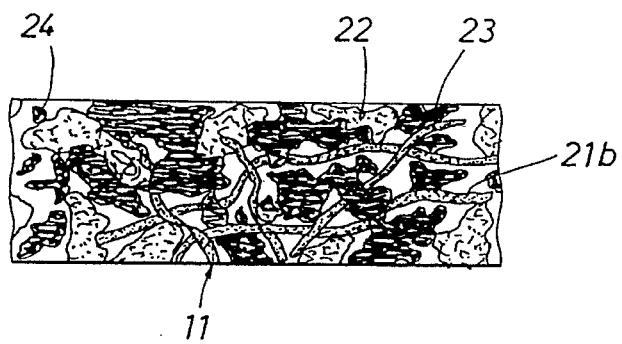
FIG. 4 is a diagrammatic drawing of the mechanical embodiment of another of the electrodes of this invention in magnified schematics showing the use of a fibrous dielectric material.

In yet another embodiment, the disclosed capacitor 10 with a double electric layer as shown in FIG. 3 comprises two electrodes 11 impregnated with an electrolyte and separated with an electron insulating ion conducting separator 12.

Separator 12 is also impregnated with an electrolyte. The capacitor 10 comprises electron conducting, electrolytic impermeable current collectors 13 taken from a group of pliable thin sheets of electrolyte inert material. The current collectors 13 embrace electrodes 11 and are separated with an insulating gasket 15 along the perimeter 14 of the capacitor 10. It should be noted that the insulating gasket 15 serves the function of a humidifying seal and insulating gasket. It should also be noted that the exterior surface of the capacitor 10 which are the collectors 13 rise up a significant distance over the point of union of the gasket 15 and the surface 16 of collectors 13. Thus, as will be further explained herein, upon compression of the capacitor the gasket 15 does not interfere with the transmission of force for the driving of the collector surface 14 of electrode 11, ion separator 12 and the electrodes 11 into close conducting relationship.

The above electrode 11 can best be seen by referring to FIG. 2 wherein the electrode 11 is shown. This electrode 11 is elastically compressible and independently, mechanically stable and consists of a mixture of activated carbon, dispersed carbon, porous elastic dielectric and a polymer binder. The average size of activated carbon particles 19 use in this embodiment is from 1 micron up to 100 microns which is comparable to the electrode 11 thickness. Larger particles can cause a separator puncture upon compression. At an activated carbon particle content lower than 1% by weight the contact between the activated carbon particles 19 deteriorates and the content of the particles of higher than 30% by weight reduces the porosity of the electrode. The content of the dispersed carbon 20, for instance, which may be carbon black or graphite powder, of lower than 1% by weight does not effect the value of contact resistance, and that of higher than 40% by weight cause the reduction of the content of activated carbon 19 in the electrode and of the accumulated electrical charge.

The content of the porous dielectric particle 21 for instance can be a cellular plastic material 21a (FIG. 3) like a porous rubber and a fibrous dielectric material 21b (FIG. 4), of less than 1% by weight which does not insure the elasticity or compressibility of the electrode and that an amount higher than 30% by weight reduces the content of the carbon particles within the electrode and deteriorates the electrical properties of the capacitor.

Porous dielectric particles 21 for instance of a cellular plastic material 21a like a porous rubber having a size of less than 1 micron, substantially fills in the voids between the carbon particles, thus increasing the elasticity of an electrode. Those having a size of more than 50 microns deteriorates the contact between carbon particles, since in this case the size of the porous elastic dielectric 21 is bigger than the size of the activated carbon particles.

The fibers of dielectric material 21b which have a diameter of less than 0.3 microns do not insure the elasticity of the electrode and those having a diameter of more than 50 microns deteriorate the contact between the carbon particles. The fibers having a length of less than 0.1 mm do not improve the elasticity of the electrodes and those having length of more than 5 mm complicate the process of manufacturing a homogeneous electrode mass.

For a polymer binder 22 there can be used such polymer binders as polyvinyl alcohol, polysaccharides (for instance, carboxymethyl cellulose), or rubber (for instance, butadione, isoprene nitrile, natural silicon rubber).

In yet another preferred embodiment as in FIG. 3, having increased power, a mixture of a large highly porous carbon particle 23, a relatively smaller activated carbon particle 24, porous elastic dielectric 21 and polymer binder 22 are used to form the electrode. Also provided is the ion conducting separator and two electrolyte impermeable and electrolyte inert current collectors which are separated with an insulating gasket 15.

In this disclosed embodiment, activated carbon consists of a mixture of large activated carbon particles 23 of a size of 5 microns to 50 microns and small activated carbon particles 24 of a size of 0.5 to 5 microns with the content of the small particles being within a range of 10–50% by weight. The content of the porous elastic dielectric particle 21 in said electrode is 1–30% with the size of the particle being 1–50 microns. In this particular embodiment, the porous elastic dielectric 21 is a porous-plast, having communicating spores. An example in this particular embodiment would be a micro porous rubber. The polymer binder 22 preferred in such embodiment would be polyalcohol and polysaccharides or a rubber. Thus the electrodes are formed into a 3-dimensional elastic matrix utilizing the elastic dielectric particles 21 and binders 22 within the electrodes to form a ramified structure dense with activated carbon particles. This ramified space for positioning the relatively larger activated carbon particles 23 and the relatively smaller activated carbon particles 24 within the porous elastic dielectric material 21 for holding the larger and smaller activated carbon particles 23 and 24 in contact with each other and with the electrolyte used to impregnated the electrodes thus forms a 3-dimensional electron conducting mass. The utilization of these carbon particles in tight relationship with each other provides for high power capacity of a capacitor with a double electric layer. It should be understood that at the same time the porous elastic dielectric structure 21 has high mechanical strength with sufficient elasticity due to the present presence of the porous elastic dielectric 21 and a polymer binder 22 to achieve an elastically compressive electrode for use in the capacitor 10.

This high electrode strength allows for the manufacture of electrodes of large surface areas thus increasing the capacity for accumulating large electric charges. The elastically compressible electrode 11 being independently mechanically stable provides for sufficient contact with the current collectors 13 when under compression to provide improved ionic conductivity in the porous space of the activated carbon thus reducing energy loss in the capacitor.

As a result the power of the capacitor with the double electric layer is increased and the capacitor design is simplified because there is no need to be concerned with the shape of the electrode. Strong elastically compressible electrodes simplify the assembly of a capacitor, and provide for the introduction of automated processing assembly of capacitors with the double electric layers.

In the preferred embodiment, the collector plates 13 are made of electrolyte impermeable and electrolyte inert thin sheets of metal or metal foils so that they are pliable. The separator 12 and two electrodes 11 are impregnated with the electrolyte to activate the capacitor. It would be appreciated that within the electrode as shown in FIG. 3, the activated carbon particles fill the spaces made by the porous elastic dielectric particles 21 and the polymer binder 22. These dielectric particles form a 3-dimensional elastic matrix and are also impregnated with electrolyte. The activated large and smaller carbon particles 23 and 24 being in contact with each other and held securely by the polymer binder 22 and the elastic dielectric particles 21 are formed into a 3-dimensional electron conducting mass having a ramified structure for providing good contact and conductance.

In this embodiment, the activated carbon consists of a mixture of large particles 23 of the size of 5 to 50 microns and small particles 24 of activated carbon of the size of 0.5 to 5 microns with the content of the small particles being within the range of 10%–50% by weight.

Also the content of the porous elastic dielectric particles 21 is preferably in a range of 1% to 30% by weight with the size of the particles ranging from 1 micron to 50 microns. This range provides for sufficient rigidity and elasticity of the electrodes but also elasticity. The content of the particles of less than 1% by weight does not effect rigidity and elasticity but the content of the particles by more than 50% by weight reduces the content of the activated carbon in the electrodes thus reducing the electric charge accumulated by the electrodes. Elastic dielectric particles of the size of less than 1 micron mainly fill in the voids between the activated carbon particles and have almost no effect on the mechanical properties of the electrode. Elastic dielectric particles of a size of more than 50 microns deteriorates the contact between the carbon particles thus reducing conductivity.

One porous elastic dielectric which is preferred is a porous-plast having communicating pores which helps keep the electrolyte within the electrode and improves ion conductivity of the electrode.

Also used are porous elastic dielectrics from a fiber dielectric material having open pores which insures good electrolyte impregnation of the fiber and they are relatively inexpensive and chemically stable.

Also used are polymer binders which are preferably polyvinyl alcohol, polysaccharides such as carbosilieon cellulose (pulp) or rubber, (i.e. butodiene rubber, isoprene rubber, isoprene nitriol) as they adhere to activated carbon and are chemically stable in electrolyte solutions, (i.e. butadiene and isoprene).

It will also be appreciated that this capacitor with a double electric layer is designed to accumulate electrical charge and to further discharge on load. When charged and discharged the electric current in the capacitor is carried by both electrons and ions. The presence of the electron conductive ramified matrix formed by the activated carbon particles and ion conductive matrix formed by the porous dielectric and polymer binder impregnated with electrolyte, improves electron and ion conductivity, reduces electrode resistance and increases power capacity of the capacitor with the double electric layer. It should be understood by those skilled in the art that the use of the foil layer for a electrolyte-impermeable and electrolyte inert current collectors allows for the greatest possible contact between the surface of the electrode 11 and the current collector 13 especially if pressure is applied to the current collector forcing it against the surface of the electrode.

Since no matter how good the manufacturing process, it should be appreciated that the ionic separator 12 and current collector 13 are pliable such that the surface contact between the electrodes 11 and the current collector 13 and/or the ionic conductor separator 12 can be as high an absolute contact as possible when they are pressed to conform with each other. It will be understood by those skilled in the art that one of the problems in capacitors is the obtaining of a high degree of contact between the electrode 11 and the current collectors 13 and also the ionic conductor separator 12. Any pockets or voids will cause a loss of the ability to transfer or to conduct. Thus, by utilizing an elastic compressible electrode 11 and utilizing foil or pliable current collector 13 in this capacitor and also utilizing the configuration which keeps the surface of the current collector 13 significantly above the gasket 15 between the two current collectors that a significant amount of pressure may be applied to a capacitor 10 or a stacked series of capacitors 10 such that all the surfaces within the capacitor stack (i.e. collector, separator, electrode) can have conforming deformation with each other for good contact because of the pliability of all the surfaces to each other to achieve as high a conductance as possible.

Clearly, providing the polymer binders and porous elastic dielectric with the carbon dispersed through the matrix thereof, such that upon compression, the carbon particles are held in place and driven together during the elastic compression of the capacitor improves the conductance.

While carbon particles of varying size and porosity have been given as preferred embodiments, those skilled in the art will recognize that any highly porous and highly conductive material might be used to achieve the results herein disclosed and claimed.

Other modes of applying the principle of this invention may be employed instead of those specifically set forth above, changes being made as regards the details herein disclosed provided the elements set forth in any of the following claims, or the equivalent of such be employed.

It is, therefore, particularly pointed our and distinctly claimed as the invention.

We claim:

1. An electrical capacitor comprising a. an electrolyte, b. at least one pair of electrolyte-impregnated electrodes which are elastically compressible and independently mechanically stable, said electrodes comprising a porous elastic dielectric means and a separate polymer binder, c. a separator impregnated with said electrolyte between and in contact with both of said at least one pair of electrolyte-impregnated electrodes for ionic conductance and electronically separating said electrodes, d. at least one pair of electrolyte-impermeable and electrolyte inert current collectors having a first and a second of said pair in contact with a first and a second respectively of the at least one pair of electrolyte-impregnated electrodes, and e. an uncompressed gasket for separating said at least one pair of electrolyte-impermeable and electrolyte inert current collectors outward of said separator and along the capacitor perimeter.

2. An electrical capacitor of claim 1 wherein said one pair of electrolyte-impregnated electrodes which are elastically compressible and independently mechanically stable are further comprised of a. coarse porous particles, b. relatively smaller particles down to one-thousandth of the size of said coarse particles, and c. three-dimensional elastic matrix means formed by the polymer binder and having ramified spaces for positioning said porous elastic dielectric means, said coarse porous particles and said relatively smaller particles therein so as to be in contact with each other and for said electrolyte used to impregnate said electrodes for forming a three-dimensional electron-conducting ramified mass, said relatively smaller particles being positioned in the interstices between said course porous particles in said matrix for enhanced surface-to-surface particle contact.

3. An electrical capacitor of claim 2 wherein said coarse porous particles comprise a mixture of activated carbon particles, and said relatively smaller particles comprise dispersed carbon.

4. An electrical capacitor of claim 5 wherein said mixture of activated carbon particles comprises a mixture of coarse porous particles having an average size within the range of 1–100 microns and said mixture of small particles comprises a mixture of relatively smaller particles having an average size within the range of 0.1 to 1 micron and the content of said small particles being within the range of 1.0 to 30% percent by weight.

5. An electrical capacitor of claim 3 wherein said mixture of activated carbon particles comprises a mixture of coarse porous particles having an average size within the range of 1–100 microns and said relatively smaller dispersed carbon particles have an average size within the range of 0.1 to 1 micron and the content of said smaller dispersed carbon particles being within the range of 1.0% to 40% percent by weight.

6. An electrical capacitor of claim 5 wherein said smaller dispersed carbon particles are carbon black.

7. An electrical capacitor of claim 5 wherein said smaller dispersed carbon particles are graphite carbon.

8. An electrical capacitor of claim 2 wherein the content of said porous elastic dielectric means in said at least one pair of electrolyte-impregnated electrodes is within the range of 1% to 30% by weight.

9. An electrical capacitor of claim 8 wherein said porous elastic dielectric means further comprises a cellular plastic material having communicating pores and an average diameter size of said material is within the range of 1 to 50 microns.

10. An electrical capacitor of claim 9 wherein said cellular plastic material is micro-porous rubber.

11. An electrical capacitor of claim 2 wherein said porous elastic dielectric mean further comprises fibrous dielectric materials having a diameter of fibers from 0.3 to 50 microns, and lengths thereof from 0.1 to 5 millimeters.

12. An electrical capacitor of claim 2 wherein said polymer binder further comprises a polyvinyl alcohol.

13. An electrical capacitor of claim 2 wherein said polymer binder further comprises a polysaccharide.

14. An electrical capacitor of claim 2 wherein said polymer binder further comprises rubber.

15. An electrical capacitor of claim 2 wherein said polymer binder further comprises a fluoroplastic.

16. An electrical capacitor of claim 2 wherein said separator and said at least one pair of electrolyte impermeable and electrolyte inert current collectors are made from surface conforming pliable materials for substantial contact with said at least one pair of electrolyte-impregnated electrodes when said capacitor is compressed.

17. An electrical capacitor of claim 16 wherein said at least one pair of electrolyte impermeable and electrolyte inert current collectors are made of foil.

18. An electrical capacitor of claim 2 wherein said gasket separating said at least one pair of electrolyte impermeable and electrolyte inert current collectors is sufficiently thin so as to be substantially below the external surfaces of said at least one pair of electrolyte impermeable and electrolyte inert current collectors for allowing compressive deformation of said capacitor and no compression on said gasket.

19. An electrical capacitor of claim 1 wherein said porous elastic dielectric means comprises fibrous dielectric materials.

20. An electrical capacitor of claim 1 wherein said one pair of electrolyte-impregnated electrodes which are elastically compressible and independently mechanically stable are further comprised of a. large porous particles,
b. relatively smaller porous particles down to one-thousandth of the size of said coarse particles, and
c. three-dimensional elastic matrix means formed by the polymer binder and having ramified spaces for positioning said porous elastic dielectric means, said large porous particles and said relatively smaller porous particles therein so as to be in contact with each other and for said electrolyte used to impregnate said electrodes for forming a three-dimensional electron-conducting ramified mass, said relatively smaller particles being positioned in the interstices between said large porous particles in said matrix for enhanced surface-to-surface particle contact.

21. An electrical capacitor of claim 20 wherein said porous elastic dielectric means further comprises fibrous dielectric materials.

22. An electrical capacitor of claim 21 wherein said large porous particles further comprises a mixture of activated carbon particles, and said relatively smaller porous particles further comprises smaller activated carbon particles than said large porous particles.

23. An electrical capacitor of claim 22 wherein said mixture of activated carbon particles further comprises a mixture of large porous particles having an average diameter size within the range of 5 to 50 and said smaller porous carbon particles further comprises a mixture of small particles having an average diameter size within the range of 0.5 to 5 microns and the content of said small particles being within the range of 10% to 50% by weight of said large porous particles.

24. An electrical capacitor of claim 22 wherein said porous elastic dielectric means further comprises porous elastic dielectric particles having an average diameter size within the range of 1 to 50 microns and said porous elastic dielectric particles being within the range of 1.0% to 30% by weight of said large porous particles.

25. An electrical capacitor of claim 24 wherein said porous elastic dielectric further comprises a porous-plast having communicating pores.

26. An electrical capacitor of claim 25 wherein said porous-plast material is micro-porous rubber.

27. An electrical capacitor of claim 22 wherein said polymer binder further comprises a polyvinyl alcohol.

28. An electrical capacitor of claim 22 wherein said polymer binder further comprises a polysaccharide.

29. An electrical capacitor of claim 22 wherein said polymer binder further comprises rubber.

30. An electrical capacitor of claim 22 wherein said separator and said at least one pair of electrolyte impermeable and electrolyte inert current collectors are made from surface conforming pliable materials for substantial contact with said at least one pair of electrolyte-impregnated electrodes when said capacitor is compressed.

31. An electrical capacitor of claim 22 wherein said at least one pair of electrolyte impermeable and electrolyte inert current collectors are made of foil.

32. An electrical capacitor of claim 22 wherein said gasket separating said at least one pair of electrolyte impermeable and electrolyte inert current collectors is sufficiently thin so as to be substantially below the external surfaces of said at least one pair of electrolyte impermeable and electrolyte inert current collectors for allowing compressive deformation of said capacitor and no compression on said gasket.

33. An electric double layer capacitor comprising
a. at least one pair of electrodes made of a mixture of activated carbon, dispersed carbon, porous dielectric particles and separate polymer binder means, b. separator means separating and in contact with at least one pair of said electrodes for ionic conductance and electronically separating said electrodes, c. a liquid electrolyte impregnating at least one pair of said electrodes and said separator, d. at least a pair of electrolyte impermeable and electrolyte inert current collectors in contact with at least one pair of said electrolyte impregnated electrodes, forming the body of the electric double layer capacitor, and e. an insulating gasket means along the perimeter and in between said current collectors separating said current collectors and at the same time preventing the leakage of said electrolyte from the capacitor.

34. A capacitor of claim 33, wherein said mixture comprises activated carbon particles having an average diameter within the range of 1 to 100 microns and small particles of dispersed carbon having an average diameter within the range of 0.1 to 1 microns, the content of said small particles being within the range of 1.0 to 40 percent by weight.

35. A capacitor of claim 34, wherein said mixture comprises dispersed carbon within the range of 1.0 to 30 percent by weight.

36. A capacitor of claim 34, wherein said mixture comprises porous-plast particles within the range of 1 to 30 percent by weight.

37. A capacitor of claim 36, wherein said porous-plast particles have an average diameter in the range of 1 to 50 microns.

38. A capacitor of claim 36, wherein said mixture comprises fibrous porous plast particles, the fibers having an average diameter of 0.3 to 50 microns and a length of 0.1 to 5 millimeters.

39. A capacitor of claim 33, wherein said mixture comprises coarse activated carbon particles having an average diameter within the range of 5 to 50 microns and small particles having an average diameter within the range of 0.5 to 5 microns, the content of said small particles being within the range of 10 to 50 percent by weight.

40. A capacitor of claim 39, wherein said mixture comprises porous-plast particles within the range of 1 to 30 percent by weight.

41. A capacitor of claim 40, wherein said porous-plast particles have an average diameter in the range of 1 to 50 microns.

42. A capacitor of claim 40, wherein said mixture comprises fibrous porous plast particles, the afibers having an average diameter of 0.3 to 50 microns and a length of 0.1 to 5 millimeters.

* * * * *